(12) United States Patent
Randazza et al.

(10) Patent No.: US 7,793,829 B2
(45) Date of Patent: Sep. 14, 2010

(54) PAYMENT SYSTEMS AND METHODS

(75) Inventors: Joseph R. Randazza, Boca Raton, FL (US); Danilo Portal, Miramar, FL (US)

(73) Assignee: National Payment Card Association, Coconut Creek, FL (US)

(*) Notice: Subject to any disclaimer, the term of this patent is extended or adjusted under 35 U.S.C. 154(b) by 277 days.

(21) Appl. No.: 11/938,279

(22) Filed: Nov. 10, 2007

(65) Prior Publication Data

US 2008/0290155 A1 Nov. 27, 2008

Related U.S. Application Data

(63) Continuation-in-part of application No. 11/692,172, filed on Mar. 27, 2007, now abandoned, which is a continuation-in-part of application No. 11/539,636, filed on Oct. 8, 2006, now abandoned.

(60) Provisional application No. 60/724,806, filed on Oct. 11, 2005, provisional application No. 60/786,830, filed on Mar. 29, 2006, provisional application No. 60/791,217, filed on Apr. 12, 2006.

(51) Int. Cl.
*G06Q 40/00* (2006.01)
(52) U.S. Cl. .................. 235/379; 235/380; 235/375
(58) Field of Classification Search ............... 235/379, 235/380, 375; 705/17, 34, 39
See application file for complete search history.

(56) References Cited

U.S. PATENT DOCUMENTS

| | | | |
|---|---|---|---|
| 6,678,664 | B1 | 1/2004 | Ganesan |
| 6,854,642 | B2 | 2/2005 | Metcalf et al. |
| 7,104,443 | B1 | 9/2006 | Paul et al. |
| 2004/0078332 | A1 | 4/2004 | Ferguson et al. |
| 2004/0205011 | A1 | 10/2004 | Northington et al. |
| 2005/0171898 | A1 | 8/2005 | Bishop et al. |
| 2005/0203857 | A1 | 9/2005 | Friedman |

OTHER PUBLICATIONS

Best Practices, Best Practices Recommendations for the Use of Magnetic Stripes, Version 2.0, Apr. 1996.
Radu, Cristian; Implementing Electronic Card Payment Systems Published by Artech House, 2002 ISBN 1580533051, 9781580533058; pp. 18 and 46.

*Primary Examiner*—Edwyn Labaze

(57) ABSTRACT

Disclosed are payment system and methods.

42 Claims, 19 Drawing Sheets

215

215

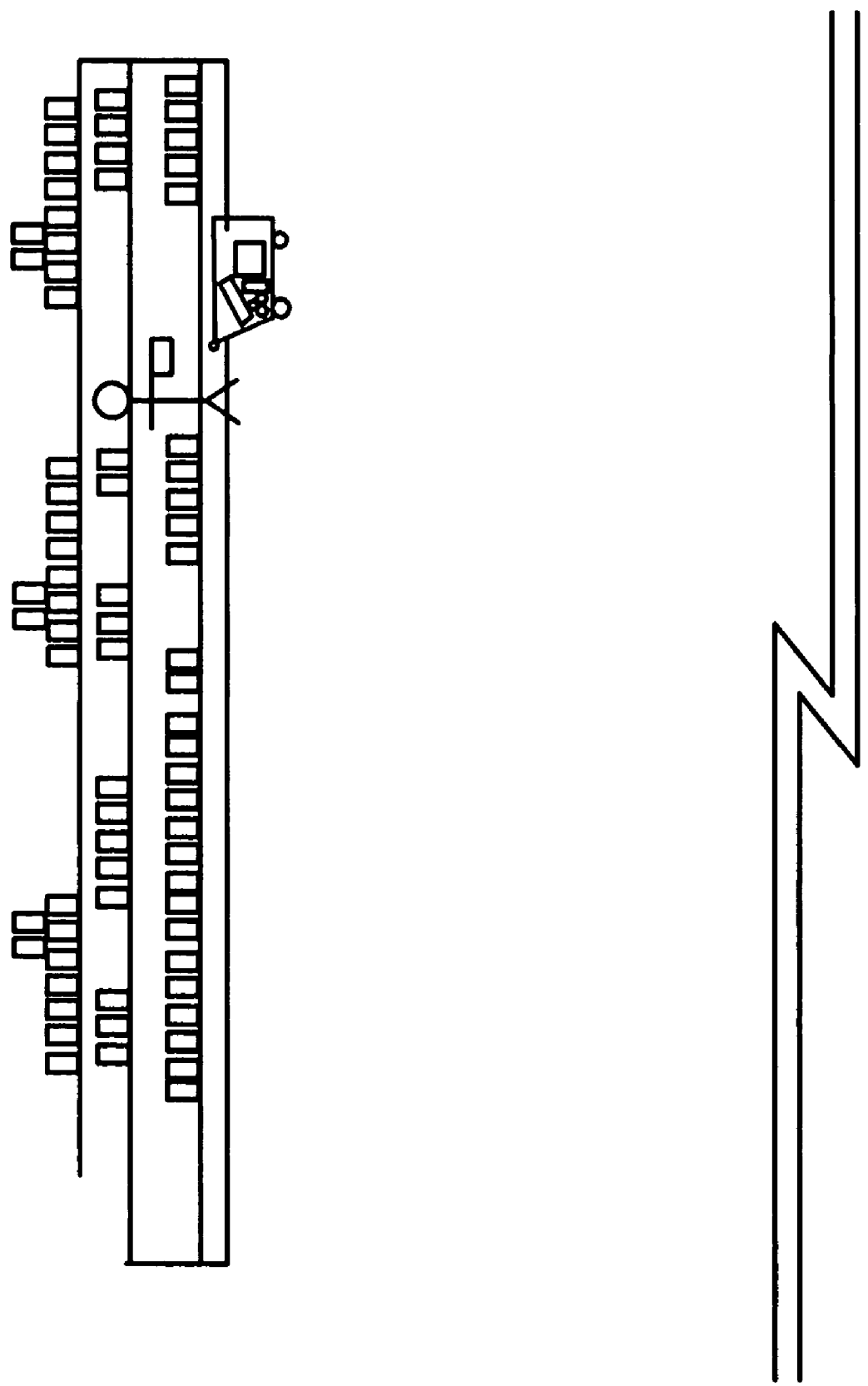

| CARD ID | ACCOUNT NUMBER | PIN |
|---|---|---|
| [card ID 1] | 8373737780387 | 82798 |
| [card ID 2] | 5620886662888 | 82681 |
| [card ID of card 215] | 1937367750748 | 60186 |
| [card ID 4] | 7863358024136 | 40876 |
| [card ID n] | 7937677826975 | 29793 |

Fig. 9

| CARD ID | GROCERY THRESHOLD | GAS STATION THRESHOLD | RETAILER SET 3 THRESHOLD |
|---|---|---|---|
| [card ID 1] | 400 | 200 | 500 |
| [card ID 2] | 350 | 200 | 0 |
| [card ID of card 215] | 400 | 200 | 500 |
| [card ID 4] | 400 | 600 | 2000 |
| [card ID n] | 400 | 200 | 500 |

GROCERY GROUP LIST    ID of retailer Safeway™, ID of retailer 6, ID of retailer Acme Grocery
GAS STATION GROUP LIST    ID of retailer 10, ID of Sunoco™, D of Shell™, ID of Texaco™
RETAILER SET 3 GROUP LIST    ID of Home Depot™, ID of Beta Hardware, ID of retailer 321

| CARD ID | TRANSACTION DATE | RETAILER ID | AMOUNT |
|---|---|---|---|
| [card ID 1] | 23:12 December 12, 2006 | [ID of retailer 6] | $34.58 |
| [card ID 1] | 08:43 December 15, 2006 | [ID of retailer 12] | $12.75 |
| [card ID 215] | 22:12 December 7, 2006 | [ID of retailer 11] | $76.46 |
| [card ID 215] | 02:43 December 15, 2006 | [ID of Texaco] | $34.21 |
| [card ID 215] | 15:23 December 15, 2006 | [ID of retailer 6] | $123.75 |
| [card ID 314] | 23:12 December 12, 2006 | [ID of retailer 6] | $34.58 |
| [card ID 314] | 08:43 December 15, 2006 | [ID of retailer 12] | $12.75 |

185

| CARD ID | ACCOUNT NUMBER | PIN |
|---|---|---|
| [card ID 1] | 8373737780387 | 82798 |
| [card ID 2] | 5620886662888 | 82681 |
| [card ID of card 215] | 1937367750748 | 60186 |
| [card ID of card 215] | 5490311119588 | 12237 |
| [card ID of card 215] | 5308949466673 | 74728 |
| [card ID 4] | 7863580024136 | 40876 |
| . | . | |
| [card ID n] | 7937678266975 | 29793 |

PAYMENT SYSTEMS AND METHODS

This application is a continuation-in-part of U.S. application Ser. No. 11/692,172 of JOSEPH R. RANDAZZA AND DANILO PORTAL filed Mar. 27, 2007 now abandoned for PAYMENT SYSTEMS AND METHODS, the contents of which are herein incorporated by reference, which is a continuation-in-part of U.S. application Ser. No. 11/539,636 of JOSEPH R. RANDAZZA AND DANILO PORTAL filed Oct. 8, 2006 now abandoned for PAYMENT SYSTEMS AND METHODS, the contents of which are herein incorporated by reference.

Application Ser. No. 11/692,172 claims the benefit of Provisional Application Ser. No. 60/786,830 of JOSEPH R. RANDAZZA AND DANILO PORTAL filed Mar. 29, 2006 for PAYMENT SYSTEMS AND METHODS, the contents of which are herein incorporated by reference.

Application Ser. No. 11/539,636 claims the benefit of Provisional Application Ser. No. 60/724,806 of JOSEPH R. RANDAZZA AND DANILO PORTAL filed Oct. 11, 2005 for PAYMENT SYSTEMS AND METHODS, the contents of which are herein incorporated by reference. Application Ser. No. 11/539,636 claims the benefit of Provisional Application Ser. No. 60/786,830 of JOSEPH R. RANDAZZA AND DANILO PORTAL filed Mar. 29, 2006 for PAYMENT SYSTEMS AND METHODS, the contents of which are herein incorporated by reference. Application Ser. No. 11/539,636 claims the benefit of Provisional Application Ser. No. 60/791,217 of JOSEPH R. RANDAZZA AND DANILO PORTAL Apr. 12, 2006 for PAYMENT SYSTEMS AND METHODS, the contents of which are herein incorporated by reference.

BACKGROUND OF THE INVENTION

Field of the Invention

This invention relates generally to payment systems and methods and, more particularly, to payment systems and methods deployed in a retail environment.

SUMMARY OF THE INVENTION

According to an aspect of the present invention, there is a method for a system having a plurality of persons; a plurality of cards issued under authority of an entity; a retail site configured with a first signal, the first signal being common to the plurality of cards; a routing system for receiving a signal and generating a network address in response to the received signal, the routing system including a plurality of wide area communication links, the routing system being configured using the first signal, the system further including a second signal on a first card in the plurality of cards; and a second system storing an association between the second signal and account information, the entity and an owner of the second system not being affiliated, the entity not being affiliated with a retailer. The method comprises the steps, performed at the retail site, of: receiving the first and second signals from the first card; sending the first and second signals into the routing system, to cause the second system to perform the steps of determining whether the first card can effect payment, responsive to the determining step, conditionally sending a message to cause an institution to send an ACH entry to the Federal Reserve ACH system, to pass the entry to a bank, where an account is issued a debit, to cause a transfer of funds to the owner of the retail site, and making an entry in an accounting system, to effectively increment an amount owed by the owner of the retail site to the owner of the second system. The method further includes the step, performed at the retail site, of conditionally effecting a transaction with a holder of the first card, depending on a signal received from the second system.

According to another aspect of the present invention, there is a transaction system for operating with a system having a plurality of persons; a plurality of cards issued under authority of an entity; a retail site configured with a first signal, the first signal being common to the plurality of cards; a routing system for receiving a signal and generating a network address in response to the received signal, the routing system including a plurality of wide area communication links, the routing system being configured using the first signal, the system further including a second signal on a first card in the plurality of cards; and a second system storing an association between the second signal and account information, the entity and an owner of the second system not being affiliated, the entity not being affiliated with a retailer. The transaction system comprises means for receiving the first and second signals from the first card; means for sending the first and second signals into the routing system, to cause the second system to perform the steps of determining whether the first card can effect payment, responsive to the determining step, conditionally sending a message to cause an institution to send an ACH entry to the Federal Reserve ACH system, to pass the entry to a bank, where an account is issued a debit, to cause a transfer of funds to the owner of the retail site, and making an entry in an accounting system, to effectively increment an amount owed by the owner of the retail site to the owner of the second system; and means for conditionally effecting a transaction with a holder of the first card, depending on a signal received from the second system.

According to yet another aspect of the present invention, there is a method for a system having a plurality of persons; a plurality of vehicles; a plurality of cards issued under authority of a government, each card evidencing a license for a person to operate a vehicle; a retail site configured with a first signal, the first signal including a license card IIN number, the first signal being common to the plurality of cards; a routing system for receiving a signal and generating a network address in response to the received signal, the routing system including a plurality of wide area communication links, the routing system being configured using the first signal, the system further including a second signal, the second signal including a personal ID number, on a first card in the plurality of cards; and a server storing an association between the second signal and account information. The method comprises the steps, performed at the retail site, of: receiving the first and second signals from the first card; sending the first and second signals into the routing system, to cause the server to perform the steps of determining whether the first card can effect payment, responsive to the determining step, conditionally sending a message to cause an institution to send an ACH entry to the Federal Reserve ACH system, to pass the entry to a bank, where an account is issued a debit, to cause a transfer of funds to the owner of the retail site, and making an entry in an accounting system, to effectively increment an amount owed by the owner of the retail site to the owner of the server. The method further includes the step, performed at the retail site, of conditionally effecting a transaction with a holder of the first card, depending on a signal received from the server.

BRIEF DESCRIPTION OF THE DRAWINGS

References are made to the following text taken in connection with the accompanying drawings, in which:

FIGS. 6A, 6B, and 6C show a retail grocery store in the first exemplary system.

FIG. 9 is a representation of a table in a database in the first exemplary system.

FIG. 12 shows another data structure in an exemplary system.

FIG. 13 shows another data structure in an exemplary system.

FIG. 16 shows another data structure in an exemplary system.

The accompanying drawings which are incorporated in and which constitute a part of this specification, illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF EXEMPLARY EMBODIMENTS

First Exemplary Embodiment

Figure 1:
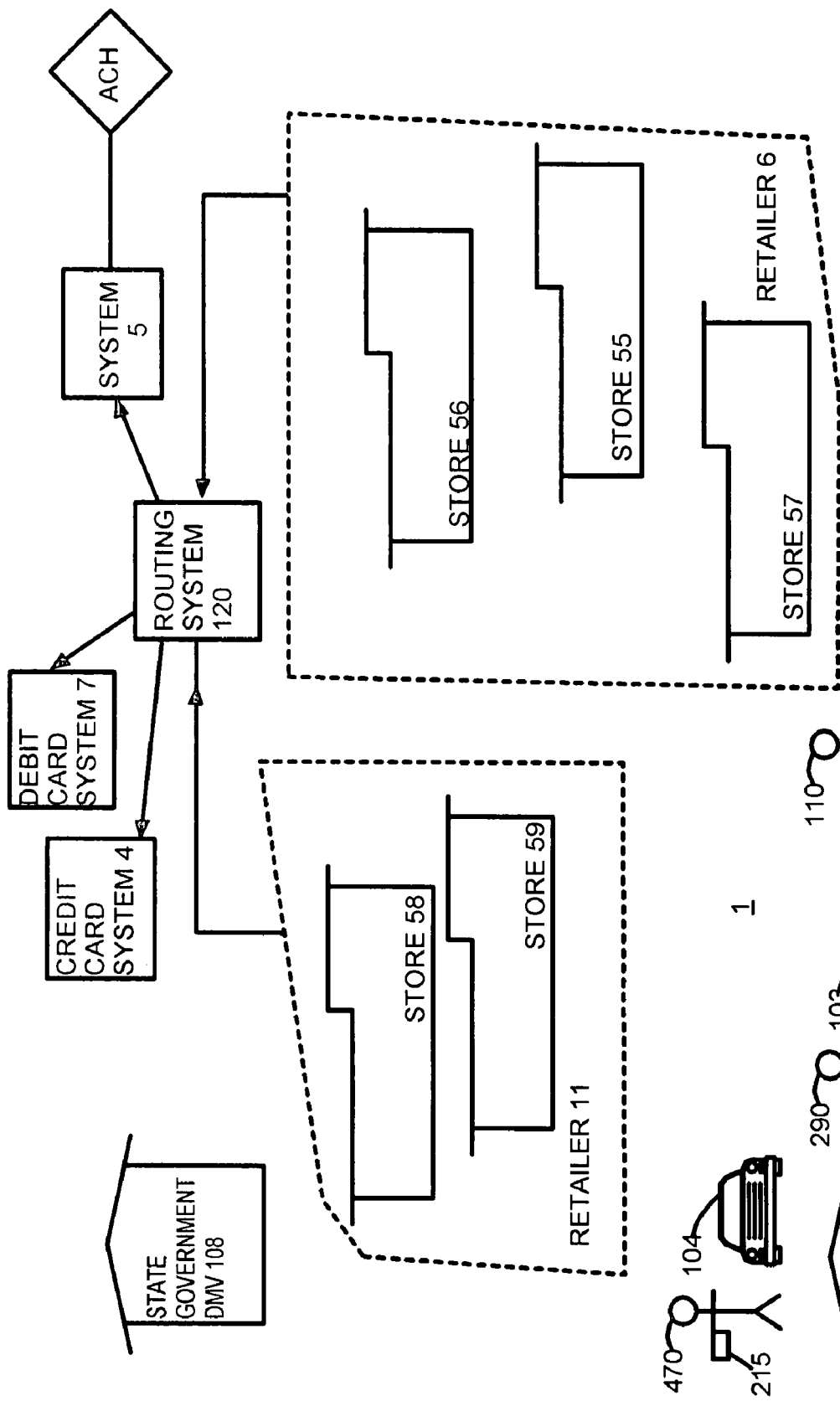
FIG. 1 shows a retail system according to a first exemplary embodiment of the present invention.

FIG. 1 shows exemplary system 1 according to a preferred embodiment of the present invention. System 1 includes multiple persons, such as person 290 and person 470. System 1 also includes a plurality of vehicles, such as automobile 103 owned by person 290 and automobile 104 owned by person 470. Person 290 operates automobile 103 to travel from her home 106 to various locations, such as her place of employment, and store 55 in retailer 6. Person 290 carries a driver's license card 295 evidencing a license to operate a vehicle such as automobile 103. Person 470 operates automobile 104 to travel from her home to various locations, such as store 55 in retailer 6. Person 470 carries a driver's license card 215 evidencing a license to operate a vehicle such as automobile 104.

These licenses and license cards 215 and 295 license were issued under the authority of a government agency, such as the Florida Department of Motor Vehicles (DMV) by Motor Vehicle Department 108, which is a part of the Florida State Government. Occasionally, persons 290 and 470 must display their driver's license cards to state officials, such as policeman 110 to prove they are authorized to operate an automobile.

Figure 2A:
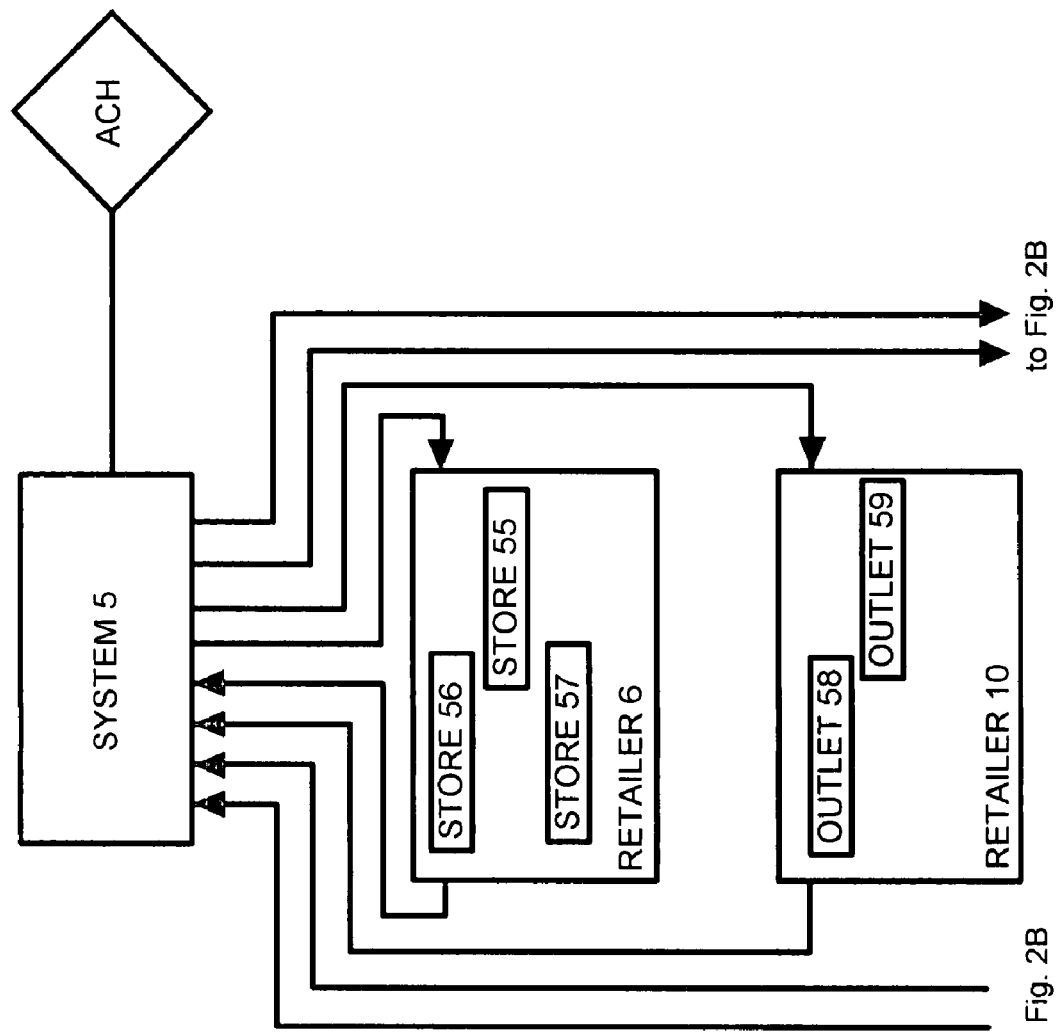
FIGS. 2A and 2B show another aspect of the first exemplary system.
Figure 2B:
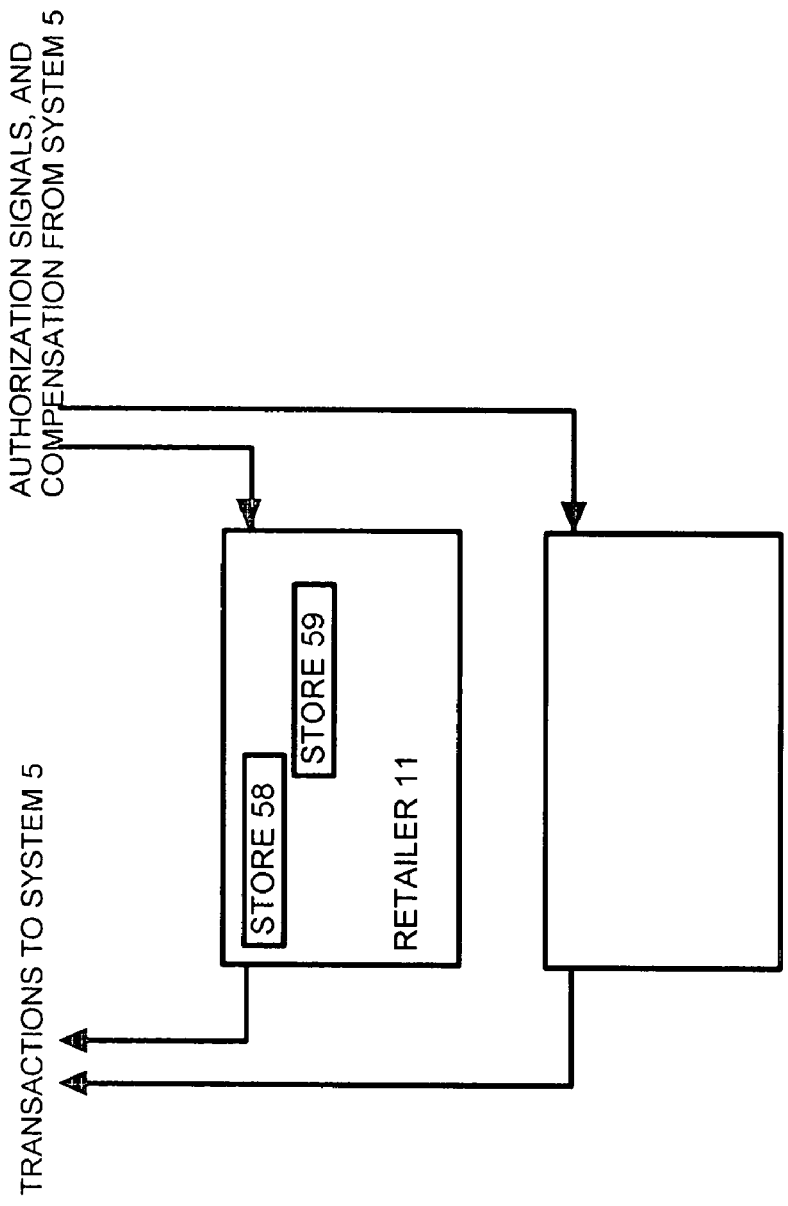

FIGS. 2A and 2B emphasize other aspects of System 1. System 1 includes system 5, which communicates with retailers 6, 10, and 11, via routing system 120. Services from payment processors—such as First Data, RBSlynk, and Fifth Third—may be configured to implement routing system 120.

System 5, in a location such as Reston, Va., receives signals from the retailers, to validate customer authorization at the time of a retail transaction, and to debit a customer account later. A signal from a retailer to system 5 is represented by a directed line going from the retailer to system 5; and a signal from system 5 to a retailer is represented by a directed line going from system 5 to the retailer.

In response to a signal from system 5, retailer 6, for example, allows a customer transaction to proceed.

System 5 is owned and operated by a private entity that is under the general control of neither the Florida State Government nor the Virginia State Government. Of course the private entity that owns and controls system 5 may have certain statutory, regulatory, contractual, or common law obligations to these state governments, as any persons resident in a state would have.

The owner of system 5 and the owner of retailer 11 are non-affiliated, meaning that they are not affiliates with respect to each other. Is this patent application, concerns are affiliates of each other when one concern controls or has the power to control the other, or a third party or parties controls or has the power to control both. Power to control is described in Section 121 of the U.S. regulations of the Small Business Administration.

The owner of system 5 and the owner of retailer 6 are non-affiliated.

The owner of system 5 and the owner of retailer 10 are non-affiliated.

Figure 3A:
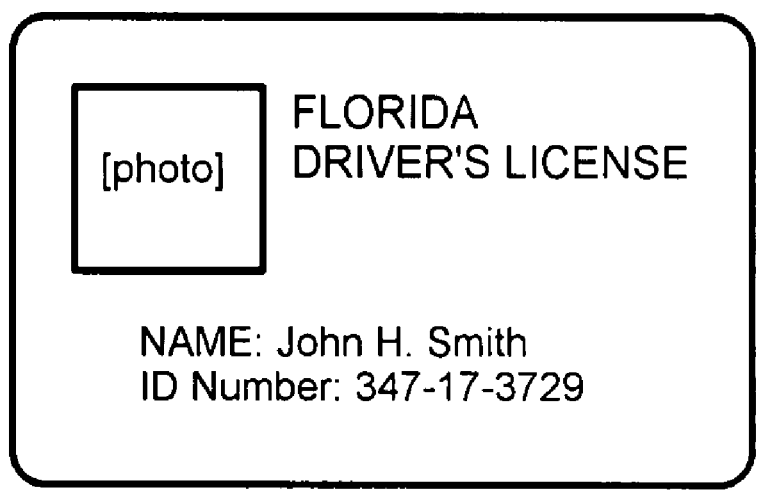
FIGS. 3A and 3B show a driver's license card in the first exemplary system.
Figure 3B:
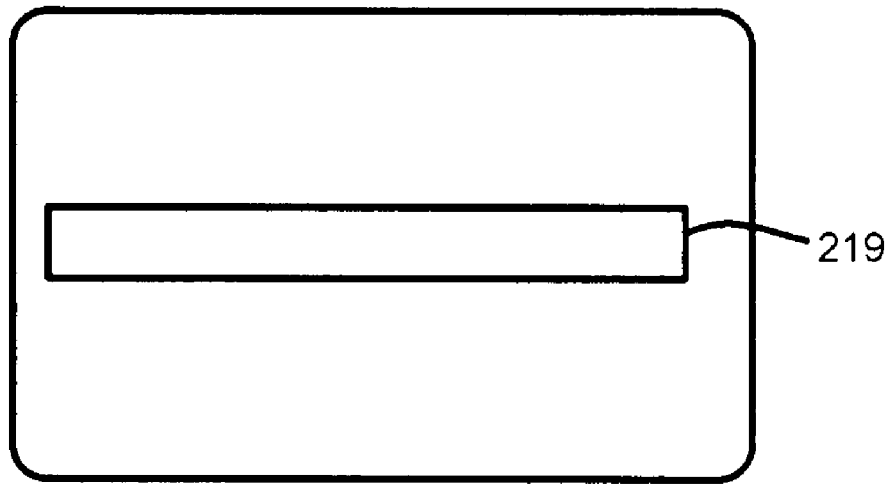

FIG. 3A shows a front, plan view of card 215 carried by person 470, who is a customer in system 1, and FIG. 3B shows a back, plan view of card 215. In this example, card 215 is a state-issued driver's license including a photograph 217 of person 470, and magnetic stripe 219 storing the ID number and other information on the reverse side. Track 2 of stripe 219 also stores the number 636010, indicating the jurisdiction of Florida, in accordance with International Standard ISO 7812.

Figure 4A:
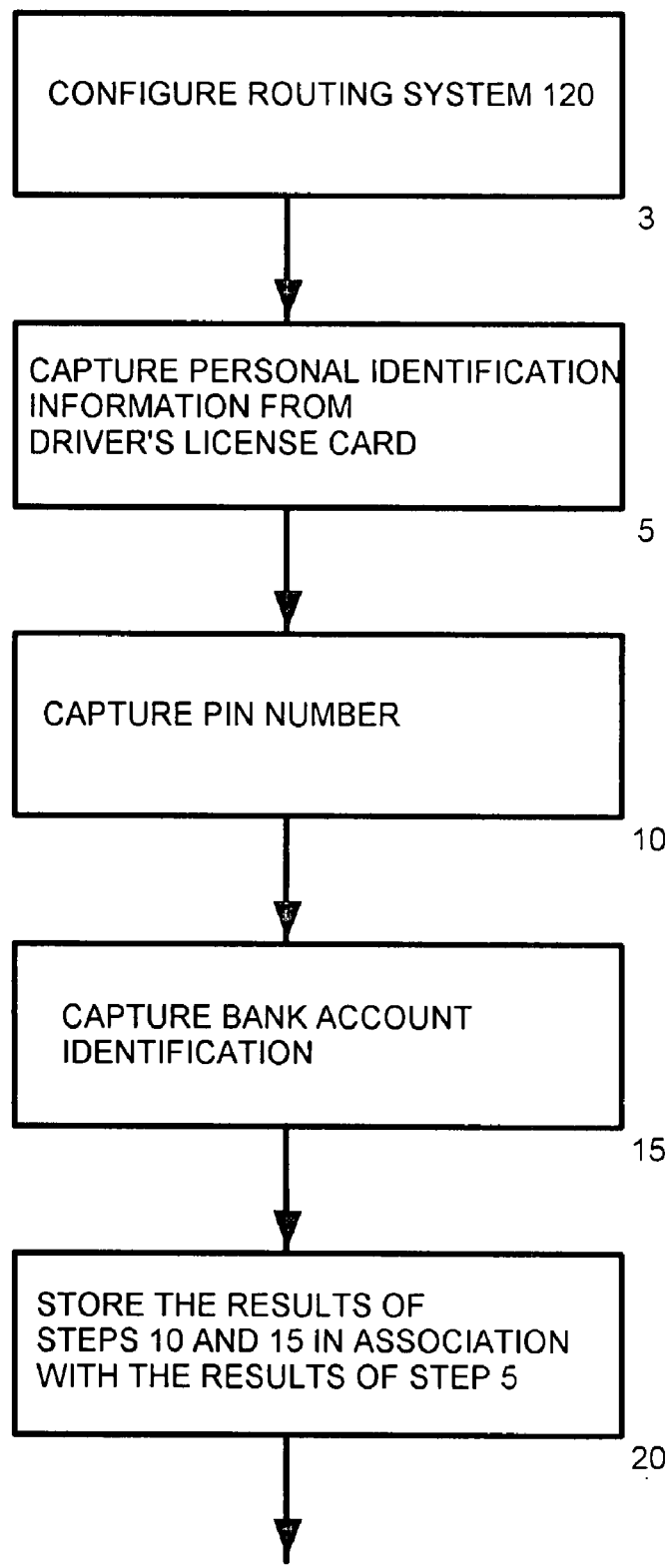
FIGS. 4A, 4B, and 4C are a flowchart of a process performed in the first exemplary system.
Figure 4B:
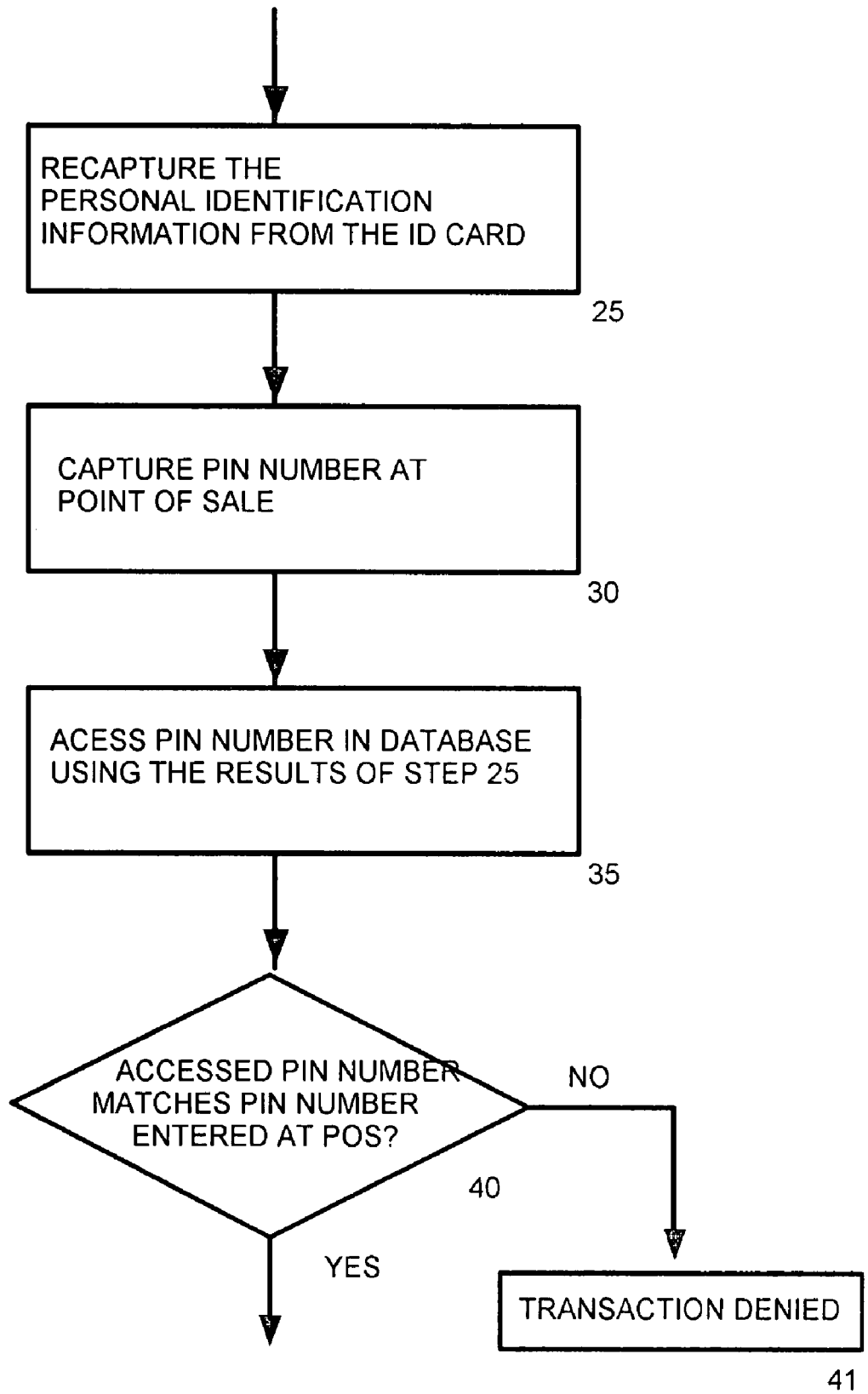
Figure 4C:
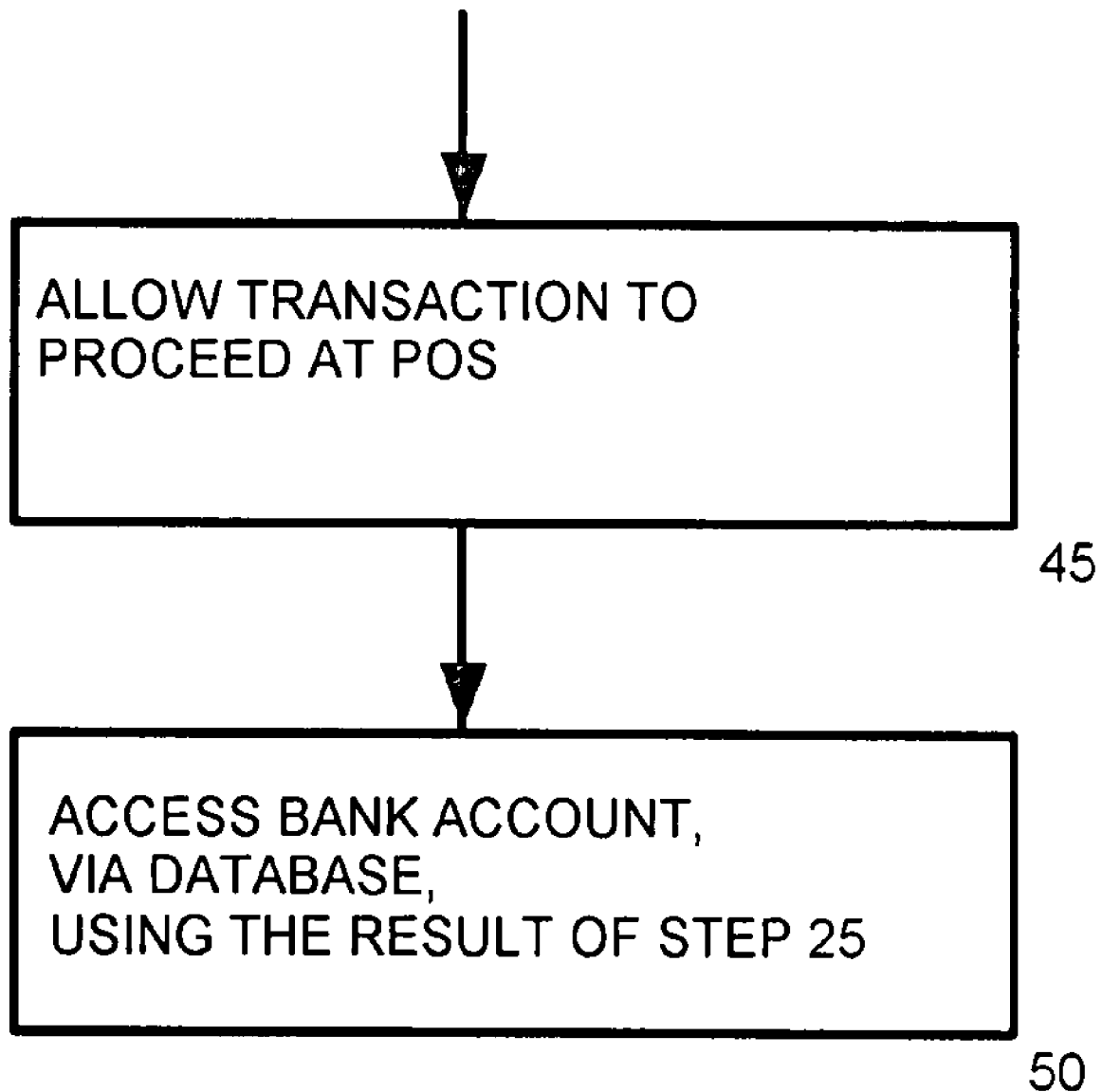

FIGS. 4A, 4B, and 4C show a process performed by circuitry in system 1. Step 3 includes configuring routing system 120, in accordance with a network address or network position, of system 5, so that certain signals will be sent to system 5, as described in more detail below.

Steps 5, 10, and 15 are performed for multiple persons, in a store of a retailer, such as retailers 6, 10, and 11. In order to enroll in the program, the customer enters a card number and bank account number at a web site. Alternately, the customer is processed at the retailer customer service area, where the magnetic stripe 219 of card 215 is scanned (step 5), a personal identification number (PIN) entry is received from the consumer into the terminal (step 10), and a personal check is scanned (step 15). The collection of the card identification number, PIN, the bank routing and account number read from the check, then becomes part of transmitted packet to system 5, in which they are stored in association in a database (step 20). The method and protocol for this transmission is TCP/IP.

Figure 6B:
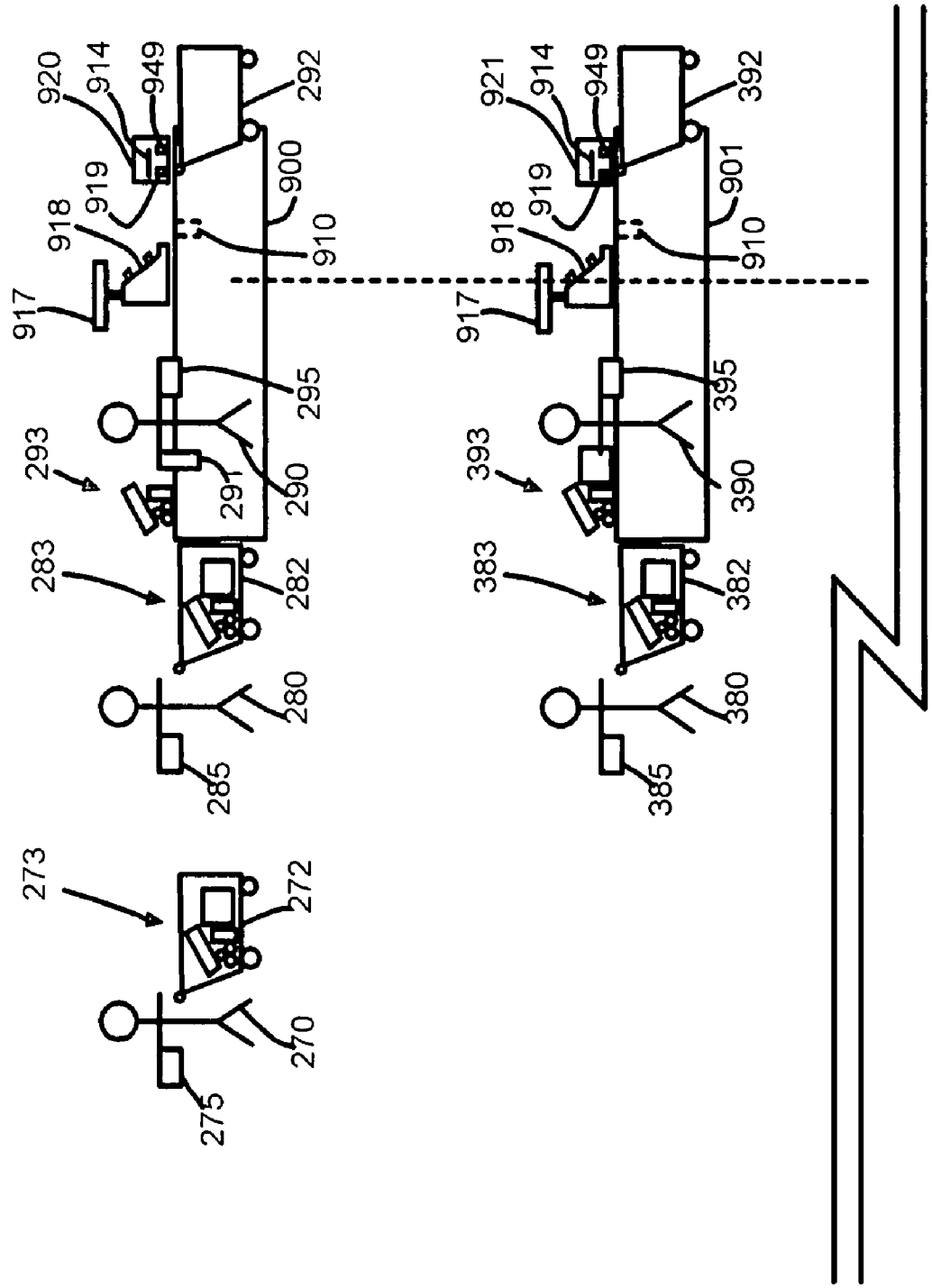
Figure 6C:
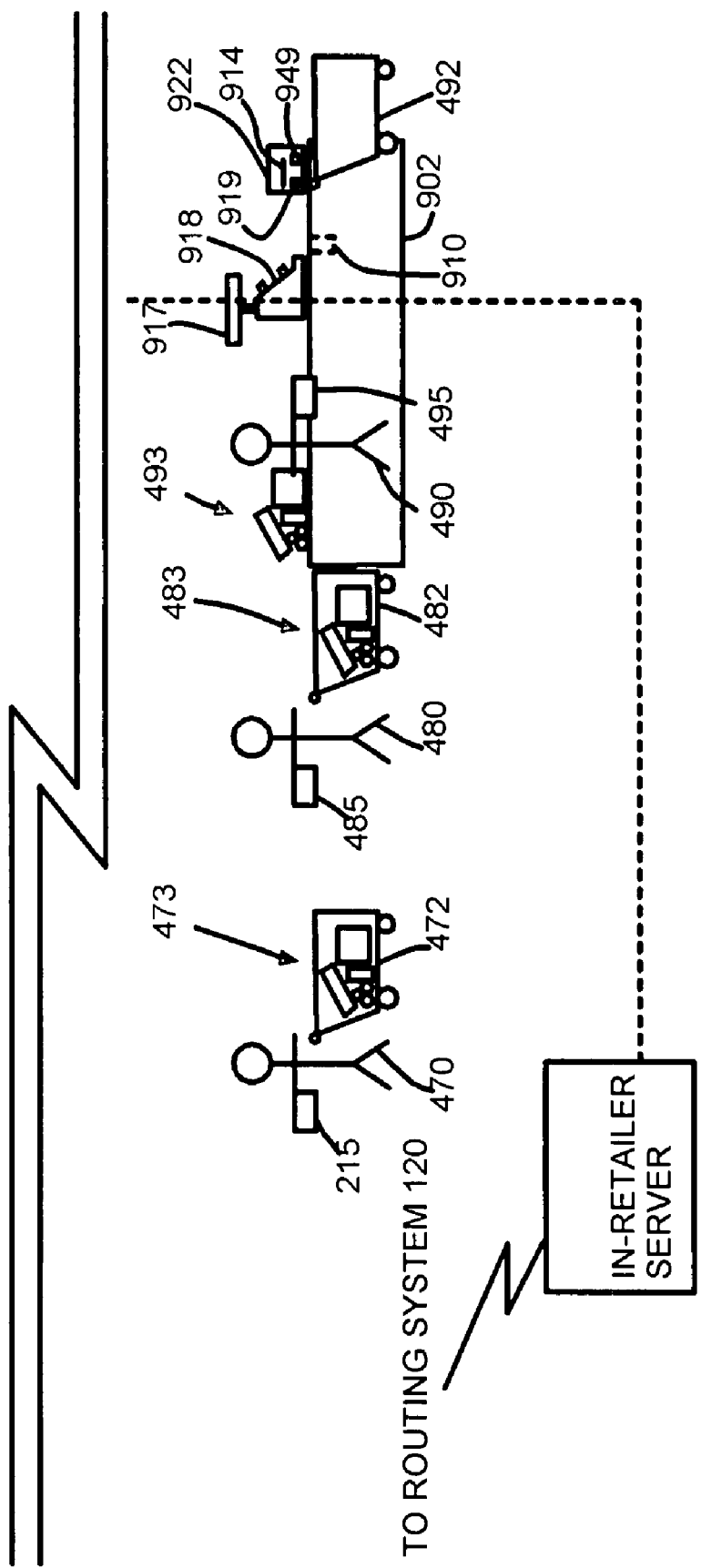

FIGS. 6A, 6B, and 6C show a context in which subsequent steps of the flow chart of FIGS. 4A, 4B, and 4C are performed. FIGS. 6A, 6B, and 6C are each a partial view of store 55 in retailer 6. Store 55 has a plurality of product areas, each corresponding to a respective product, and checkout stations 900, 901, and 902. Each checkout station includes a bar code reader that detects an optical (electromagnetic) signal reflected from a bar code, and a magnetic stripe reader that scans a magnetic card. Checkout station 900 includes payment terminal 920 having a card interface slot 914, checkout station 901 includes payment terminal 921 having a card interface slot 914, and checkout station 902 includes payment terminal 922 having a card interface slot 914. Each payment terminal includes a button 919 labeled "CREDIT" and a button 949 labeled "DEBIT". Each of these buttons is one kind of user interface object.

Upon completion of shopping, each customer brings selected products from the shelves to checkout station 900, 901, or 902.

Each customer presents her customer card. In this example, customer 490 presents credit card 495, which is associated with an installment payment account of customer 490. Customer 480 presents debit card 485, which is associated with a demand bank account of customer 480. Customer 470 presents system-5-registered driver's license card 215.

Customer 490 completes the purchase of her selected products 493 by transferring products 493 from her cart 492 to station 902, and by presenting card 495. A checkout clerk (not shown) scans each selected product past bar code reader 910, or enters the product selection information manually via keyboard 918. Checkout station 902 determines a total amount due and prints the total amount due on display 917. Customer 490 activates credit button 919. In response to the activation of credit button 919, circuitry in the retailer transmits the account number of card 495 to a credit/debit card authorization provider, such as credit card system 4 shown in FIG. 7, via routing system 120.

In this patent application, the word circuitry encompasses dedicated hardware, and/or programmable hardware, such as a CPU or reconfigurable logic array, in combination with programming data, such as sequentially fetched CPU instructions or programming data for a reconfigurable array.

Customer 480 completes the purchase of her selected products 483 by transferring products 483 from her cart 482 to station 902, and by presenting card 485. The checkout clerk scans selected products past bar code reader 910. Checkout station 902 determines a total amount due and prints the total amount due on display 917. Customer 480 activates debit button 949. In response to the activation of debit button 949, circuitry in payment terminal 922 prompts customer 480 to enter a PIN number into a keypad on terminal 922. Terminal 922 then applies an encryption key to the entered PIN number, to generate an encrypted PIN. Circuitry in the retailer then transmits the encrypted PIN and the account number of card 485 to a credit/debit card authorization provider, such as debit card system 7 shown in FIG. 7, via routing system 120. Debit card system 7 could be operated by the Master Card Corporation.

Customer 470 completes the purchase of her selected products 473 by transferring products 473 from her cart 472 to station 902, and by presenting driver's license card 215. The checkout clerk scans selected products past bar code reader 910. Checkout station 902 determines a total amount due and prints the total amount due on display 917. Station 902 reads the ID information of person 470 from card 215, and reads the Issuer Identification Number, 636010, indicating the State of Florida, from driver's license card 215. (step 25) (FIG. 4B). Customer 470 or the clerk activates debit button 949. In response to the activation of debit button 949, circuitry in payment terminal 922 prompts customer 470 to enter a PIN number into a keypad on terminal 922. Terminal 922 then applies an encryption key to the entered PIN number, to generate an encrypted PIN number. Circuitry in the retailer then transmits the encrypted PIN and the licensee identification of driver's license card 215 to system 5, via routing system 120. At this time the server also transmits retailer ID, store ID date time, lane ID, cashier ID, transaction amount.

Alternatively, station 902 may be configured so that customer 470 need not activate the credit button 919. In this alternative, station 902 detects the IIN of the card and conditionality applies an encryption key to the entered PIN depending on the detected IIN. In other words, in this example, station 902 word detects the IIN of card 215 and sends the entered PIN without applying the encryption key to the entered PIN.

Circuitry in system 5 uses the ID number of the card, transmitted by the server, to access the associated PIN stored in the database. (step 35). System 5 thus compares the PIN, transmitted by the store server, to the PIN read from the database. (step 40). Depending upon the result of step 40, system 5 conditionally responds to the store server with a card-authorized signal, causing station 902 to allow customer 470 to carry away products 473. (step 45).

Otherwise system 5 sends a card-not-authorized signal to the store server.

Step 40 may also include real-time communication to an external database to validate the card against a negative check database.

It is presently preferred that system 5 validate incoming transactions and respond back to the store within several seconds.

Figure 5:
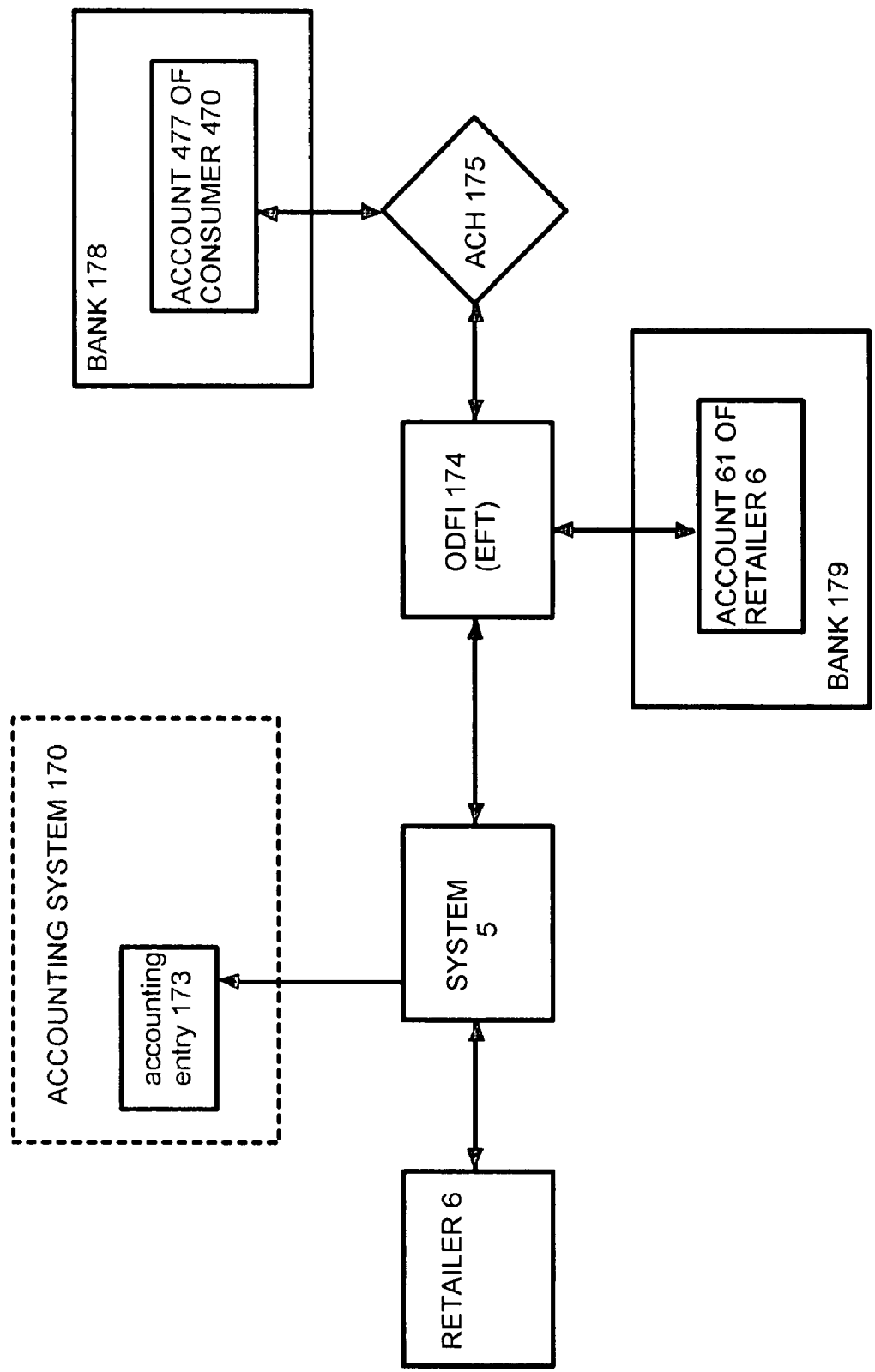
FIG. 5 shows another aspect of the exemplary system.

FIG. 5 is a diagram emphasizing other aspects of the exemplary system.

ODFI (Originating Depository Financial Institution) 174 originates a PPD (Prearranged Payment and Deposits) ACH (Automated Clearing House) entry at the request of system 5. ODFI 174 sends the PPD entry to the Federal Reserve ACH system 175, which passes the entry to bank 178, which acts as a Receiving Depository Financial Institution (RDFI), where account 477 is issued debit, provided there are sufficient funds. Thus ODFI 174 effects an Electronic Funds Transfer (EFT).

When system 5 settles a transaction by causing the transfer of funds from account 477 of consumer 470 to account 61 of retailer 6, system 5 makes an entry in accounting system 170, to effectively increment an amount 173 owed by the retailer 6 to the owner of system 5. This amount is a fee for settling the transaction.

Figure 8:
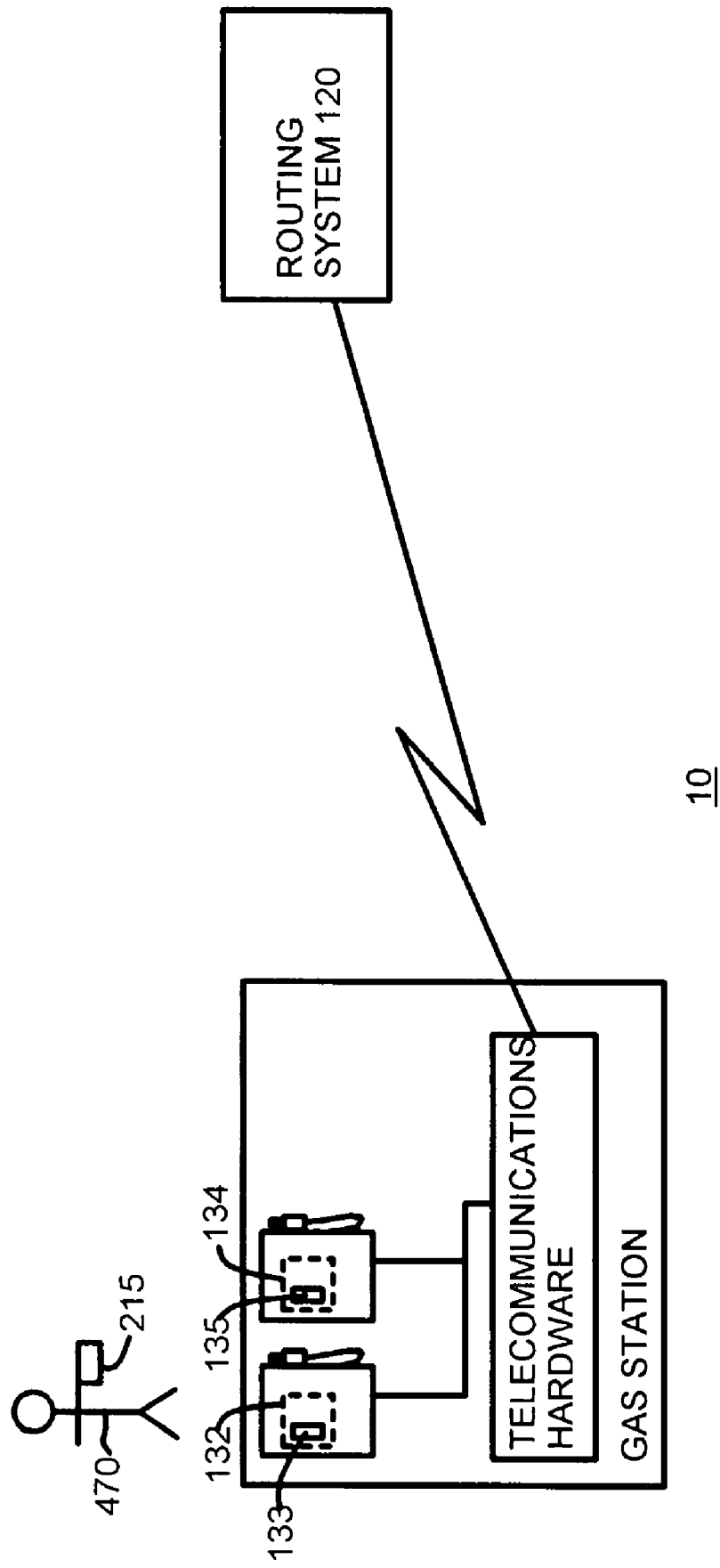
FIG. 8 shows another retail site in the first exemplary system.

FIG. 8 shows retailer 10 in system 1 in more detail. Retailer 10 includes a gas station. Computer system 131 is in the gas station. The gas station includes gas pump point of scale (POS) terminal 132 with card interface 133, gas pump POS terminal 134 with card interface 135, telecommunications circuitry, and a network cable coupling POS terminal 132, POS terminal 134 and telecommunications circuitry together.

Customer 470 buys gas by presenting card 215, either at the payment terminal 132 or elsewhere in the gas station. The gas station reads the ID information from card 215.

Circuitry in system 5 uses the ID number of the card, transmitted by circuitry in retailer 10, to access the associated PIN stored in the database. System 5 conditionally responds to the server in retailer 10 with a card-authorized signal, or a card-not-authorized signal. If the server receives a card-authorized signal, the transaction proceeds and the server then transmits a transaction amount to system 5.

Automated Clearing House (ACH) Settlement transmission occurs daily in batch fashion. (step 50). More specifically, system 5 compiles a file at end of day for submission to the ACH services. The required fields that this file contain are: date, time, transaction type, retailer ID, store ID, bank routing

, bank account #, amount of transaction. The specifics and file format is further defined with the ACH processor.

Status from ACH is collected and logged for review.

Figure 7:
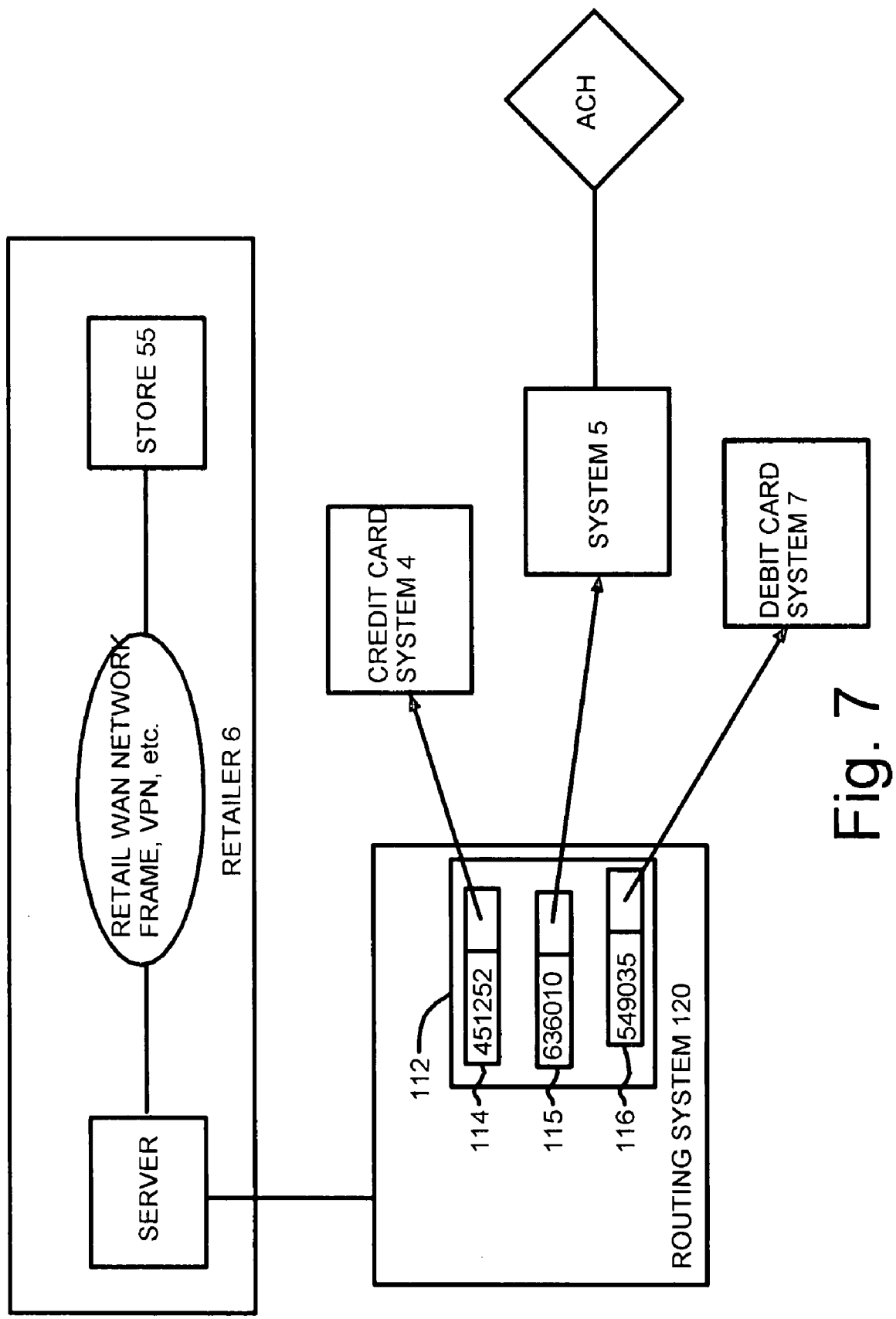
FIG. 7 is a diagram showing transaction flows in the first exemplary system.

FIG. 7 shows another aspect of the first exemplary system, including an in-retailer server that is the gateway of communication leading to routing system 120. Routing system 120 includes a data structure 112, accessed by programs in routing system 120. Data structure 112 allows routing system 120 to select the path of a transaction request packet received from a retailer, as a function of a routing field in the packet. The routing field may contain an issuer identification number (IIN). For example, when routing system 120 receives a transaction request packet containing the number 451252 in the routing field, routing system 120 accesses entry 114, to send the packet to credit card system 4, allowing system 4 to authorize a credit card transaction. Credit card system 4 could be operated by the VISA Corporation.

When routing system 120 receives a transaction request packet containing the number 636010 in the routing field, routing system 120 accesses entry 115, to send the packet to system 5. When routing system 120 receives a transaction request packet containing the number 549035 in the routing field, routing system 120 accesses entry 116, to send the packet to debit card system 7, allowing system 7 to authorize a debit card transaction.

FIG. 9 is a representation of a table 7 in a disk-resident database in system 5. Each row in table 7 is an association between a card ID and other data such as an account number associated with the card ID, and a PIN number associated with the account.

The application will have user interface to activate/inactivate/delete and reissue a card. Transaction logging contains detail information for each payment transaction. For example, the detail includes time stamp: store ID: lane ID: cashier ID: card #: payment amount: swiped vs. bar-coded.

In summary, a point-of-sale payment transaction is effected via a State issued motor vehicle driver's license card and a personal identification number (PIN) as a mechanism of payment for a retail store transaction. A State issued motor vehicle driver's license is processed to identify a consumer and initiate payment at the Point of Sale, without the use of any other form of payment.

The POS allows the driver's license to be used as a form of payment to debit a consumer checking account or savings account as a electronic fund transfer using the Federal Reserve Automatic Clearing House (ACH) for settlement.

The system utilizes the driver's license card; a PIN number or Biometric Signature for authentication; POS/payment terminal equipment; a communications network to link to retailers POS system to a ACH host processor; a data base with registered consumers banking information; the ACH system for settlement. The system can be used at any retail facility that installs the system. These include supermarkets, convenience stores, gas stations, general merchants, restaurants etc.

The system allows the consumer to enrolled into this system either at a merchant location via an operated by store personnel enrollment software program, a self-service kiosk or via the web.

The consumer enrollment process captures information identifying the consumer, to form an electronic record that is stored in a remote or local computer. Once the enrollment is complete, the consumer can use the driver's license to pay for goods and services at any merchant point of sale location using the process and technology of this system.

System 1 provides a process mechanism (Enrollment) for linking, the consumer driver's license card, based on national standard, magnetic and 2d format to be scanned or swipe, capturing the content of the magnetic data or the decoded barcode data, using a parsing algorithm that presents the data necessary to build the electronic record required by this system. This includes the driver's license number, date of birth, age, address, state issued, date driver's license is issued, date driver's license expires, gender.

Once the driver's license card information is captured, the consumer is asked to enter a PIN. The PIN is encrypted and made part of the electronic record. Next the consumer is asked to present a blank commercial bank check, this check is scanned by check reader that will capture the image of the check, the bank routing number and the bank account. Once the above process is completed the electronic record is formed and stored in a local or remote computer depending on the merchant network infrastructure.

Second Exemplary Embodiment

Figure 10:
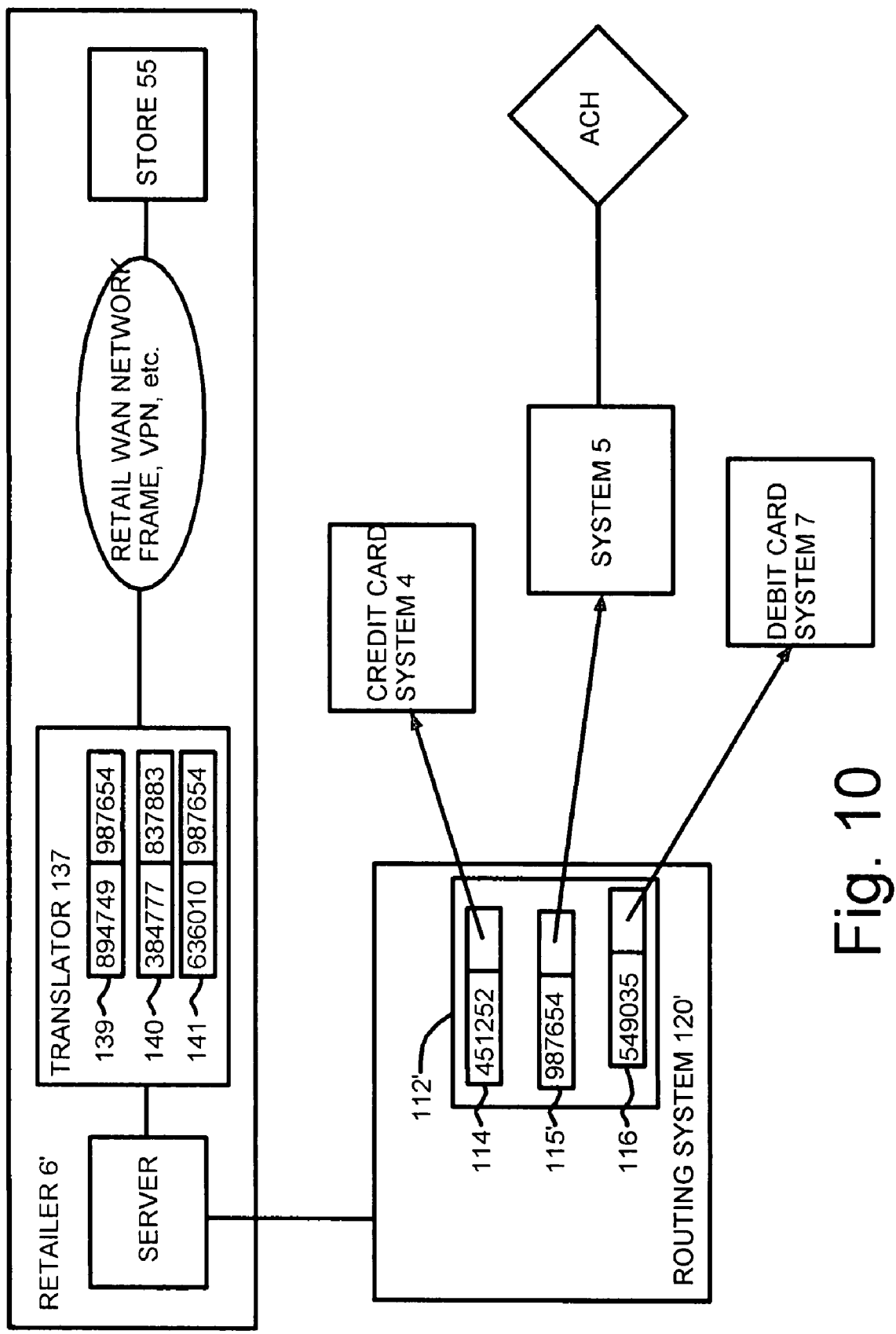
FIG. 10 is a diagram showing transaction flows in the second exemplary system.

FIG. 10 shows exemplary system 1' according to a second preferred embodiment of the present invention. System 1' includes routing system 120' circuitry in retailer 6' that is the gateway of communication leading to routing system 120'. Translator circuitry 137 detects certain Issuer Identification Numbers from cards used by consumers in retailer 6' and, responsive to such detection, translates to or substitutes a different number. For example, each of entries 139, 140, 141 contains an IIN to be detected on the left half of the entry, and contains a corresponding number to be substituted on the right half of the entry. Software executing in translator 137 examines the left half of the entries. Thus, when a POS in retailer 6' reads a number driver's license card 636010, indicating the jurisdiction of Florida, translator 137 substitutes the 636010 with 987654.

Routing system 120' includes a data structure 112', accessed by programs in routing system 120. Data structure 112' allows routing system 120' to select the path of a transaction request packet received from a retailer, as a function of a routing field in the packet. The routing field may contain an issuer identification number (IIN). For example, when routing system 120' receives a transaction request packet containing the number 451252 in the routing field, routing system 120' accesses entry 114, to send the packet to credit card system 4, allowing system 4 to authorize a credit card transaction. When routing system 120 receives a transaction request packet containing the number 987654 in the routing field, routing system 120' accesses entry 115', to send the packet to system 5. When routing system 120' receives a transaction request packet containing the number 549035 in the routing field, routing system 120 accesses entry 116, to send the packet to system 7, allowing system 7 to authorize a debit card transaction.

Throughout this patent application, certain processing may be depicted in serial, parallel, multiplexed, or other fashion, for ease of description. Actual hardware and software realizations, however, may be varied depending on desired optimizations apparent to one of ordinary skill in the art.

Third Exemplary System

System 5", according to a third exemplary system can establish various method of communication with the financial processor, including 1) frame relay connection to the financial processor to support the ISO 8583 host to host communication interface as per the specs outlines in this document; 2) an SSL session via the internet that supports the ISO 8583 format; and an https communication via the internet. This method provides a faster implementation, which avoids the set-up of a network infrastructure.

In order to enroll in the program, a consumer is prompted for a driver's license number, a PIN entry, a bank routing, and a demand bank account number, which then becomes part of transmitted packet via a secure SSL connection to System 5".

The transaction at the POS is effected using some of the circuitry used to effect a debit card transaction. The transaction is tendered as debit payment, the driver's license is swiped at the payment terminal and a prompt for PIN is generated. The pin is encrypted with the current processor PIN algorithm and flows from the store to the Financial Processor encrypted in similar fashion as for bank debit cards.

Pin encryption will follow the current standard use by the payment processor used by the retailers. Once the transaction signal reaches the processor, the processor will decrypt the pin and re-encrypt using a System 5" key. The transaction is then sent to System 5" for processing.

Message Header

Regardless of message format all incoming and outgoing message to System 5" switch should have the following message format.

| Field Name | Length | Description |
| --- | --- | --- |
| ID | 2 | Value should always be "NP" |
| Length | 4 | Length of message not including header length in network format |

ISO 8583 Format

Introduction

ISO 8583 specifies a common interface by which financial transaction may be interchanged between financial systems. It specifies messages structure, format and content, data elements and value of data element.

Message Structure

Each message identified in the ISO is constructed in the following sequence: message header, message type identifier, one or more bitmaps and a series of data elements in order of the bitmap representation.

1. Message Type Identifier

A four digit numeric field describing each message class and function. Every message shall start with a message identifier. Only the message identifier related to this design will be described in this document. Refer to ISO 8583 document for a complete list of all identifiers.

| Message Type | Description | Originating System |
| --- | --- | --- |
| 0200 | Authorization Request | Acquirer |
| 0210 | Authorization Response | Card Issuer |
| 0100 | Pre-Authorization Request | Acquirer |
| 0110 | Pre-Authorization Response | Card Issuer |
| 0220 | Completion Request | Acquirer |
| 0230 | Completion Response | Card Issuer |

2. Bitmaps

The second component of each ISO 8583 message is the bitmap of the particular message. Each message may be composed of one or if two bitmaps (If large amount of data needs to be transferred).

The primary bitmap (64 bits) is present in every message. The secondary bitmap is only present if one or more elements with the bitmap number in the ranges of 65-128 are present in the message. Bit 1 in the primary bitmap indicates the presence (1) or absence (0) of the secondary bitmap. In general, frequently used data elements are assigned bitmap number in the range of 1-64.

3. Data Element Format and Attributes

This section describes the format and attributes of data elements.

a. Attribute Type Definition

The following table describes the different attribute type describing data elements.

| Attribute | Description |
| --- | --- |
| 'a' | Alphabetic character |
| 'b' | Bitmap |
| 'n' | Numeric |
| 'p' | Pad character, space |
| 's' | Special character |
| 'an' | Alphanumeric |
| 'as' | Alphabetic and special character |
| 'ns' | Numeric and Special character |
| 'anp' | Alphabetic, numeric and pad character |
| 'ans' | Alphanumeric and special character |
| 'z' | Track 2 data | b. Attribute Length

The following table describes units used to indicate the size of the elements.

| Type | Unit |
| --- | --- |
| 'b' | Bit |
| 'n' | Numeric digit |
| 'z' | Track 2 digit | c. Format Definition

Data elements defined with an entry in the format columns are expressed in a following format.

| Type | Description |
| --- | --- |
| LL | Unit length of variable data which follows (00-99) |
| LLL | Unit length of variable data which follows (000-999) |
| MM | Month (01-12) |
| DD | Day (01-31) |
| YY | Year (00-99) |
| hh | Hour (00-23) |
| mm | Minute (00-59) |
| ss | Second (00-59) |

4. System 5" Supported Data Elements

| Bit | Data Element Name | Format | Attribute |
| --- | --- | --- | --- |
| 2 | Card Number | LLVAR | n . . . 19 |
| 4 | Dollar Amount | | n12 |

-continued

| Bit | Data Element Name | Format | Attribute |
|---|---|---|---|
| 11 | POS transaction number | | n6 |
| 12 | Time of Transmission | hhmmss | n6 |
| 13 | Date of Transaction | MMDDYY | n6 |
| 33 | Merchant Code | LLVAR | n . . . 11 |
| 32 | Store # | LLVAR | n . . . 11 |
| 38 | Authorization Code | | an8 |
| 39 | Approval Code | | n . . . 3 |
| 41 | POS lane # | | ans8 |
| 42 | Cashier ID | | ans15 |
| 57 | Authorization Life Cycle Length must be 3 postion1 = unit type, 0 = no time period, 1 = days, 2 = hours, 3 = minutes position 2 and 3 set to value of period | LLLVAR | n3 |
| 58 | User defined field1 | LLLVAR | ans . . . 100 |
| 59 | User defined field2 | LLLVAR | ans . . . 100 |
| 60 | PIN | LLVAR | an16 |

5. System 5" Supported Response Codes

| Approval Code | Description |
|---|---|
| 00 | Transaction submitted Successfully |
| 12 | Invalid Date or time |
| 13 | Invalid or missing amount. |
| 14 | Invalid or missing account number. |
| 32 | Invalid or missing Merchant Code |
| 55 | Invalid data in PIN Number field |
| 76 | Invalid data in User Defined Field 1 |
| 77 | Invalid data in User Defined Field 2 |
| 78 | Cardholder Account On Hold |
| 79 | Cardholder Account Over Velocity Limits |
| 80 | Cardholder Account Blocked |
| 91 | Issuer or switch is inoperative |
| 94 | Duplicate transaction - The transaction was accepted previously |

ISO 8583 Messages

1. Authorization Request

The authorization request message may contain the following data elements. The presence of each element will be reflected in the associated bitmap.

| Bit | Element Name |
|---|---|
| | Message Type (0200) |
| | Primary Bitmap |
| 2 | Card Number |
| 4 | Dollar Amount |
| 11 | POS transaction number |
| 12 | Time of Transmission |
| 13 | Date of Transaction |
| 32 | Store # |
| 33 | Merchant Code |
| 41 | POS lane # |
| 42 | Cashier ID |
| 58 | User defined field1 |
| 59 | User defined field2 |
| 60 | PIN |

2. Authorization Response

The authorization response message may contain the following data elements. The presence of each element will be reflected in the associated bitmap.

| Bit | Element Name |
|---|---|
| | Message Type (0210) |
| | Primary Bitmap |
| 2 | Card Number |
| 4 | Dollar Amount |
| 11 | POS transaction number |
| 12 | Time of Transmission |
| 13 | Date of Transaction |
| 32 | Store # |
| 33 | Merchant Code |
| 38 | Authorization Code |
| 39 | Approval Code |
| 41 | POS lane # |
| 42 | Cashier ID |
| 58 | User defined field1 |
| 59 | User defined field2 |

3. Pre-Authorization Request

The pre-authorization request message may contain the following data elements. The presence of each element will be reflected in the associated bitmap.

| Bit | Element Name |
|---|---|
| | Message Type (0100) |
| | Primary Bitmap |
| 2 | Card Number |
| 4 | Dollar Amount |
| 11 | POS transaction number |
| 12 | Time of Transmission |
| 13 | Date of Transaction |
| 32 | Store # |
| 33 | Merchant Code |
| 41 | POS lane # |
| 42 | Cashier ID |
| 57 | Authorization Life Cycle |
| 58 | User defined field1 |
| 59 | User defined field2 |
| 60 | PIN |

4. Pre-Authorization Response

The pre-authorization response message may contain the following data elements. The presence of each element will be reflected in the associated bitmap.

| Bit | Element Name |
|---|---|
| | Message Type (0110) |
| | Primary Bitmap |
| 2 | Card Number |
| 4 | Dollar Amount |
| 11 | POS transaction number |
| 12 | Time of Transmission |
| 13 | Date of Transaction |
| 32 | Store # |
| 33 | Merchant Code |
| 38 | Authorization Code |
| 39 | Approval Code |
| 41 | POS lane # |
| 42 | Cashier ID |
| 58 | User defined field1 |
| 59 | User defined field2 |

5. Completion Request

The pre-authorization completion request message may contain the following data elements. The presence of each element will be reflected in the associated bitmap.

| Bit | Element Name |
|---|---|
|  | Message Type (0220) |
|  | Primary Bitmap |
| 2 | Card Number |
| 4 | Dollar Amount |
| 11 | POS transaction number (From 0100 message) |
| 12 | Time of Transmission (From 0100 message) |
| 13 | Date of Transaction (From 0100 message) |
| 32 | Store # |
| 33 | Merchant Code |
| 38 | Authorization Code (From 0110 message) |
| 39 | Response Code (From 0110 message) |
| 41 | POS lane # |
| 42 | Cashier ID |
| 58 | User defined field1 |
| 59 | User defined field2 |
| 60 | PIN |

6. Completion Response

The pre-authorization completion response message may contain the following data elements. The presence of each element will be reflected in the associated bitmap.

| Bit | Element Name |
|---|---|
|  | Message Type (0210) |
|  | Primary Bitmap |
| 2 | Card Number |
| 4 | Dollar Amount |
| 11 | POS transaction number |
| 12 | Time of Transmission |
| 13 | Date of Transaction |
| 32 | Store # |
| 33 | Merchant Code |
| 38 | Authorization Code |
| 39 | Approval Code |
| 41 | POS lane # |
| 42 | Cashier ID |
| 58 | User defined field1 |
| 59 | User defined field2 |

Other systems and options for enrollment and transaction processes may be found in U.S. Application Ser. No. 60/724,806 of JOSEPH R. RANDAZZA AND DANILO PORTAL FOR filed Oct. 11, 2005 for PAYMENT SYSTEMS AND METHODS, the contents of which are herein incorporated by reference.

Fourth Exemplary System

Figure 11:
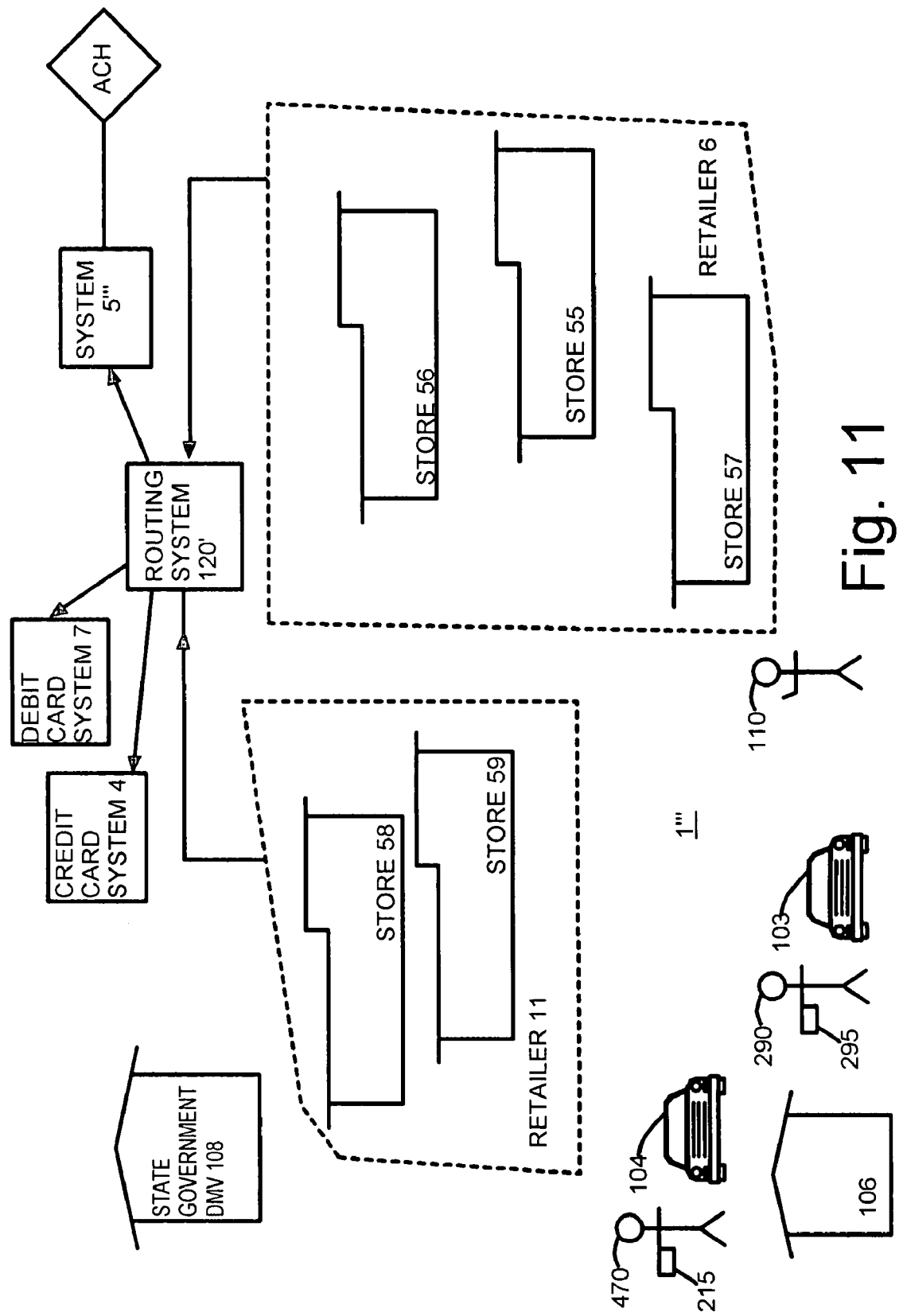
FIG. 11 shows a system according to a fourth exemplary embodiment.

FIG. 11 shows exemplary system 1''' including system 5''' according to a fourth exemplary embodiment of the present invention. System 5''' has all the circuitry for effecting the functionality of system 5 in the first preferred embodiment. System 5''' has circuitry to perform additional processing, including a retailer-specific velocity check as described below. Velocity thresholds may vary with the retailer or type of industry. For example, the threshold for grocery stores may be different from the threshold for gas stations.

FIG. 12 is a representation of a data structure 181 in system 1'. Data structure 181 is in a disk-resident database in system 5'''. Each row in data structure 181 represents an association between a card ID and a set of velocity thresholds. Each threshold corresponds to a retailer set. A retailer set may contain one or more retailers.

In this example, the first column after card ID is a velocity threshold for a grocery retailer set, the second column is a velocity threshold for a gas station retailer set, and the third column is a velocity threshold for another set of retailers.

A retailer may be alone in its own set.

A retailer may belong to more than one set.

Thus, system 1''' may have a threshold specific to a particular retailer. The system may also have a threshold specific to a market sector, encompassing multiple retailers. For examples, the system may have a threshold that is compared to the sum of gasoline purchases occurring in the Texaco™, Sonoco™, and other gasoline stations.

FIG. 13 shows data structure 183 representing the sets corresponding to the columns of FIG. 12. Each row in data structure 183 represents a retailer set. Each retailer set includes one or more retailers.

Figures 14, 15:
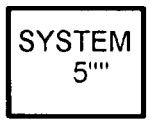
FIG. 14 shows another data structure in an exemplary system.
FIG. 15 shows a system according to a fifth exemplary embodiment.

FIG. 14 shows data structure 185 storing a transaction history for each card ID. Each row of data structure 185 represents a transaction.

For example, customer 470 buys gas by presenting card 215, either at the payment terminal 132 or elsewhere in the gas station. The gas station circuitry reads the ID information from card 215. A server in retailer 6 recognizes the identification number of card 215 to be that of a system-5'''-registered card and, in response to this recognition, sends the identification number of card 215 to system 5'''.

Circuitry in system 5''' uses the ID number of the card to select a row in data structure 181. Circuitry in system 5' uses the retailer ID to select a row in data structure 183, thereby selecting a retailer set. The selected retailer set thereby determines a column in data structure 181, thereby selecting a velocity threshold for this consumer at this retail site (row 3, column 3 of data structure 181).

System 5''', for a given transaction date range in data structure 185, adds the transaction amounts for the retailer IDs that are present in the list of the row selected data structure 183. System 5''' conditionally responds to the server in retailer 6 with a card-authorized signal, or a card-not-authorized signal, depending upon whether the sum is above the velocity threshold for this consumer at this retail site.

If the server receives a card-authorized signal, the transaction proceeds and the server then transmits a transaction amount to system 5'''. Circuitry in system 5''' then adds a row, to data structure 185, to record the transaction that just occurred in retailer 6.

Fifth Exemplary Embodiment

FIG. 15 shows exemplary system 5'''' according to a fifth exemplary embodiment of the present invention. System 5'''' has all the circuitry for effecting the functionality of system 5 in the first preferred embodiment. System 5'''' has circuitry to perform additional processing, including selecting from multiple accounts associated with a common card as described below.

FIG. 16 is a representation of a data structure 187 in system 5''''. Data structure 187 is a disk resident database in system 5''''. Each row in data structure 187 is an association between a card ID and one or more account numbers associated with the card ID, and a respective PIN number associated with each account.

System 5'''' has circuitry to select the account depending upon the PIN entered at the POS.

In an enrollment process in the third exemplary system, circuitry receives personal ID information from a driver license; and receives information corresponding to multiple accounts, each account corresponding to a respective first number (account number) previously displayed to a user, on a bank statement for example. System 5"" stores a link between the ID information and the account information.

To effect the transaction at retailer 6, system 5"" receives the ID information from the driver license, and receives a PIN from the holder of the license. System 5"" uses the received ID information to debit a selected one of the accounts, the account being selected by the second number (PIN).

The account number has more digits than the PIN. The account number presented to the user on a paper statement, and the PIN is selected by the user. The account number has a first number of digits, and the PIN has a second number of digits less than the first number of digits. The first number of digits is at least 12, and the second number of digits is at least 4.

Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims. In general, the words "first," "second," etc., employed in the claims do not necessarily denote an order.

What is claimed is:

1. A method for a system having a plurality of persons; a plurality of cards issued under authority of an entity; a retail site configured with a first signal, the first signal being common to the plurality of cards; a routing system for receiving a signal and generating a network address in response to the received signal, the routing system including a plurality of wide area communication links, the routing system being configured using the first signal, the system further including a second signal on a first card in the plurality of cards; and a second system storing an association between the second signal and account information, the entity and an owner of the second system not being affiliated, the entity not being affiliated with a retailer, method comprising: steps, performed at the retail site, of:

receiving the first and second signals from the first card;
sending the first and second signals into the routing system,
to cause the second system to perform steps of
determining whether the first card can effect payment,
responsive to the determining step, conditionally sending a message to cause an institution to send an ACH entry to the Federal Reserve ACH system, to pass the entry to a bank, where a first account is issued a debit, the ACH entry causing the Federal Reserve ACH system to transfer funds to a second account, the second account belonging to the owner of the retail site, and making an entry in an accounting system, to effectively increment an amount owed by the owner of the retail site to the owner of the second system,
wherein the method further includes the step, performed at the retail site, of:
conditionally effecting a transaction with a holder of the first card, depending on a signal received from the second system.

2. The method of claim 1 further including steps, performed before the steps of claim 1, of receiving the second signal;

receiving account information;
storing the association between the second signal and the account information.

3. The method of claim 1 wherein the signal received from the second system includes an indication whether the card is authorized to effect payment.

4. The method of claim 1 wherein the second system is in the United States of America.

5. The method of claim 1 wherein the first account is a demand account.

6. The method of claim 1 wherein the system further includes a plurality of vehicles, the entity is a government, and each card evidences a license for a person to operate a vehicle.

7. The method of claim 6 wherein the entity is a first state government, and the second system is in the territory of a second state government.

8. The method of claim 1 wherein the information corresponding to the account includes an account number previously presented to a consumer.

9. The method of claim 1 wherein the information corresponding to the account includes an account number previously presented to a consumer user on a paper statement generated by the financial institution managing the account.

10. The method of claim 9 wherein the financial institution is a bank or credit union.

11. The method of claim 1 wherein receiving the second signal from the first card includes receiving the second signal via a point of sale terminal, and the method further includes
receiving a third signal from the holder of the first card; and
sending the third signal out of the point of sale terminal, without applying an encryption key to the third signal.

12. The method of claim 11 wherein the third signal includes a PIN typed by the holder of the first card.

13. The method of claim 1 further including
receiving a number from the holder of the first card, wherein sending the second signal includes sending the second signal to cause a debit to a selected one of multiple first accounts associated with the holder, the first account being selected by the number.

14. The method of claim 13 wherein the number is a personal identification number selected by the user, the number having less digits than the account number.

15. The method of claim 13 wherein the number is a personal identification number selected by the user, the number having a least 4 digits, and less digits the account number.

16. The method of claim 1 wherein sending the first and second signals into the routing system allows the routing system to access a data structure by using the first signal, to generate a network address, to allow the routing system to send the second signal to the second system.

17. The method of claim 1 further including
determining whether to authorize a second transaction depending on an amount of the second transaction, a time of the second transaction, a retailer of the second transaction, an amount of the first transaction, a time of the first transaction, and the retailer of the first transaction.

18. The method of claim 17 wherein determining includes determining whether the party of the first transaction request and the party of the second transaction request are in a common market sector.

19. The method of claim 18, wherein determining includes determining whether the party of the first transaction request and the party of the second transaction request both are selling gasoline.

20. The method of claim 17 wherein determining includes an amount of transaction requests exceeds a threshold per unit time.

21. The method of claim 17 further including receiving information corresponding to a third account, the third account corresponding to a number previously displayed to a user, wherein the first transaction request is directed to the first account, and the second transaction request is directed to the third account.

22. A transaction system for operating with a system having a plurality of persons; a plurality of cards issued under authority of an entity; a retail site configured with a first signal, the first signal being common to the plurality of cards; a routing system for receiving a signal and generating a network address in response to the received signal, the routing system including a plurality of wide area communication links, the routing system being configured using the first signal, the system further including a second signal on a first card in the plurality of cards; and a second system storing an association between the second signal and account information, the entity and an owner of the second system not being affiliated, the entity not being affiliated with a retailer, the transaction system comprising:

means for receiving the first and second signals from the first card;

means for sending the first and second signals into the routing system, to cause the second system to perform steps of determining whether the first card can effect payment, responsive to the determining step, conditionally sending a message to cause an institution to send an ACH entry to the Federal Reserve ACH system, to pass the entry to a bank, where a first an account is issued a debit, the ACH entry causing the Federal Reserve ACH system to transfer funds to a second account, the second account belonging to the owner of the retail site, and making an entry in an accounting system, to effectively increment an amount owed by the owner of the retail site to the owner of the second system; and means for conditionally effecting a transaction with a holder of the first card, depending on a signal received from the second system.

23. A method for a system having a plurality of persons; a plurality of vehicles; a plurality of cards issued under authority of a government, each card evidencing a license for a person to operate a vehicle; a retail site configured with a first signal, the first signal including a license card IIN number, the first signal being common to the plurality of cards; a routing system for receiving a signal and generating a network address in response to the received signal, the routing system including a plurality of wide area communication links, the routing system being configured using the first signal, the system further including a second signal, the second signal including a personal ID number, on a first card in the plurality of cards; and a server storing an association between the second signal and account information, method comprising: steps, performed at the retail site, of:

receiving the first and second signals from the first card;

sending the first and second signals into the routing system, to cause the server to perform steps of determining whether the first card can effect payment, responsive to the determining step, conditionally sending a message to cause an institution to send an ACH entry to the Federal Reserve ACH system, to pass the entry to a bank, where a first account is issued a debit, the ACH entry causing the Federal Reserve ACH system to transfer funds to a second account, the second account belonging to the owner of the retail site, and making an entry in an accounting system, to effectively increment an amount owed by the owner of the retail site to the owner of the server, wherein the method further includes the step, performed at the retail site, of:

conditionally effecting a transaction with a holder of the first card, depending on a signal received from the server.

24. The method of claim 23 further including steps, performed before the steps of claim 23, of receiving the second signal;

receiving account information;

storing the association between the second signal and the account information.

25. The method of claim 23 wherein the signal received from the server includes an indication whether the card is authorized to effect payment.

26. The method of claim 23 wherein the server is in the United States of America.

27. The method of claim 23 wherein the first account is a demand account.

28. The method of claim 23 wherein the entity is a first state government, and the server is in the territory of a second state government.

29. The method of claim 23 wherein the information corresponding to the account includes an account number previously presented to a consumer.

30. The method of claim 23 wherein the information corresponding to the account includes an account number previously presented to a consumer user on a paper statement generated by the financial institution managing the first account.

31. The method of claim 30 wherein the financial institution is a bank or credit union.

32. The method of claim 23 wherein receiving the second signal from the first card includes receiving the second signal via a point of sale terminal, and the method further includes receiving a third signal from the holder of the first card; and sending the third signal out of the point of sale terminal, without applying an encryption key to the third signal.

33. The method of claim 32 wherein the third signal includes a PIN typed by the holder of the first card.

34. The method of claim 23 further including receiving a PIN from the holder of the first card, wherein sending the second signal includes sending the second signal to cause a debit to a selected one of multiple first accounts associated with the holder, the first account being selected by the PIN.

35. The method of claim 34 wherein the PIN is selected by the user, the PIN having less digits than the account number.

36. The method of claim 34 wherein the PIN is selected by the user, the PIN having a least 4 digits, and less digits the account number.

37. The method of claim 23 wherein sending the first and second signals into the routing system allows the routing system to access a data structure by using the first signal, to generate a network address, to allow the routing system to send the second signal to the server.

38. The method of claim 23 further including determining whether to authorize a second transaction depending on an amount of the second transaction, a time of the second transaction, a retailer of the second transaction, an amount of the first transaction, a time of the first transaction, and the retailer of the first transaction.

39. The method of claim 38 wherein determining includes determining whether the party of the first transaction request and the party of the second transaction request are in a common market sector.

40. The method of claim 39 wherein determining includes determining whether the party of the first transaction request and the party of the second transaction request both are selling gasoline.

41. The method of claim 38 wherein determining includes an amount of transaction requests exceeds a threshold per unit time.

42. The method of claim 38 further including receiving information corresponding to a third account, the third account corresponding to a number previously displayed to a user, wherein the first transaction request is directed to the first account, and the second transaction request is directed to the third account.

* * * * *